United States Patent
Mohanty

(10) Patent No.: US 10,459,432 B2
(45) Date of Patent: Oct. 29, 2019

(54) SLICING AND MERGING PRODUCTION EVENTS

(71) Applicant: General Electric Company, Schenectady, NY (US)

(72) Inventor: Kshirod Mohanty, San Ramon, CA (US)

(73) Assignee: General Electric Company, Schenectady, NY (US)

(*) Notice: Subject to any disclaimer, the term of this patent is extended or adjusted under 35 U.S.C. 154(b) by 6 days.

(21) Appl. No.: 15/795,529

(22) Filed: Oct. 27, 2017

(65) Prior Publication Data

US 2019/0129387 A1    May 2, 2019

(51) Int. Cl.
| | |
|---|---|
| *G05B 19/418* | (2006.01) |
| *G06Q 10/06* | (2012.01) |
| *H04L 29/08* | (2006.01) |
| *H04W 4/38* | (2018.01) |
| *G06F 16/2458* | (2019.01) |
| *H04W 84/18* | (2009.01) |

(52) U.S. Cl.
CPC ....... *G05B 19/418* (2013.01); *G06F 16/2474* (2019.01); *G06Q 10/063* (2013.01); *H04L 67/1097* (2013.01); *H04W 4/38* (2018.02); *H04L 67/02* (2013.01); *H04W 84/18* (2013.01)

(58) Field of Classification Search
CPC .......................... G06Q 10/06; G05B 19/41865
See application file for complete search history.

(56) References Cited

U.S. PATENT DOCUMENTS

| | | | |
|---|---|---|---|
| 2006/0015203 A1* | 1/2006 | Fukushima | G06Q 10/06 700/100 |
| 2007/0168067 A1* | 7/2007 | Yaji | G05B 19/41865 700/100 |
| 2007/0219835 A1* | 9/2007 | Steinbach | G06Q 10/063 705/7.27 |
| 2007/0219929 A1* | 9/2007 | Steinbach | G06Q 10/06 705/80 |
| 2008/0154412 A1* | 6/2008 | Steinbach | G05B 19/41865 700/97 |
| 2008/0154660 A1* | 6/2008 | Steinbach | G06Q 10/06 705/7.11 |
| 2015/0112468 A1* | 4/2015 | Rudnick, III | G05B 19/41865 700/98 |
| 2015/0277693 A1* | 10/2015 | Fukao | G05B 19/0405 715/769 |

* cited by examiner

*Primary Examiner* — Ronald D Hartman, Jr.
(74) *Attorney, Agent, or Firm* — Buckley, Maschoff & Talwalkar, LLC

(57) ABSTRACT

The example embodiments are directed to a system and method for analyzing different production events as a group by modeling the production events as intervals of time. In one example, the method includes modeling a plurality of production processes as a plurality of intervals of time which are overlapping one another on a graph over a predetermined period of time, each modeled production process including a sequence of events over time, determining a slice of time on the graph within the predetermined period of time based on event timings within the plurality of production process, identifying an event that is occurring in each production process during the slice of time based on the overlapping plurality of intervals of time, and storing the identified events of each production process together as a group along with an identification of the slice of time.

20 Claims, 5 Drawing Sheets

FIG. 3

| Time Slice | Event Merge |
|---|---|
| t1-t2 | Electrical, Product A, Shift 1, User 1, In Production, July 13th |
| t2-t3 | None, Product A, Shift 1, User 1, In Production, July 13th |
| t3-t4 | Feeder, Product A, Shift 1, User 1, In Production, July 13th |
| t4-t5 | Feeder, Product A, Shift 1, User 2, In Production, July 13th |
| t5-t6 | None, Product A, Shift 1, User 2, In Production, July 13th |
| t6-t7 | None, Product B, Shift 1, User 2, In Production, July 13th |
| t7-t8 | None, Product B, Shift 2, User 2, In Production, July 13th |
| t8-t9 | None, Product B, Shift 2, User 3, In Production, July 13th |
| t9-t10 | Starved, Product B, Shift 2, User 3, In Production, July 13th |
| t10-t11 | Starved, Product C, Shift 2, User 3, In Production, July 13th |
| t11-t12 | None, Product C, Shift 2, User 3, Out of Production, July 13th |

SLICING AND MERGING PRODUCTION EVENTS

BACKGROUND

Machine and equipment assets are engineered to perform particular tasks as part of a process. For example, assets can include, among other things and without limitation, industrial manufacturing equipment on a production line, drilling equipment for use in mining operations, wind turbines that generate electricity on a wind farm, transportation vehicles, gas and oil refining equipment, and the like. As another example, assets may include devices that aid in diagnosing patients such as imaging devices (e.g., X-ray or MRI systems), monitoring equipment, and the like. The design and implementation of these assets often takes into account both the physics of the task at hand, as well as the environment in which such assets are configured to operate.

Low-level software and hardware-based controllers have long been used to drive machine and equipment assets. However, the rise of inexpensive cloud computing, increasing sensor capabilities, and decreasing sensor costs, as well as the proliferation of mobile technologies, have created opportunities for creating novel industrial and healthcare based assets with improved sensing technology and which are capable of transmitting data that can then be distributed throughout a network. As a consequence, there are new opportunities to enhance the business value of some assets through the use of novel industrial-focused hardware and software.

A production site or plant where goods are produced (e.g., manufacturing plant, factory, etc.) is an industrial site usually consisting of machines, equipment, raw materials, and the like, where workers operate machines to manufacture goods or to process one product into another. For example, industrial manufacturing plants may be used to produce food, beverages, electronics, paper, oil and gas, metals, appliances, and the like. A typical production site has multiple operational processes which occur on a regular and routine basis and which dictate how work orders are processed. For example, operational processes may include maintenance and repair of machinery and equipment, shift changes, downtime, power failures, scheduled events, and the like. However, these operational processes are difficult to analyze together because they do not involve the same variables and are therefore difficult to relate to one another. For example, it can be difficult to determine a contribution of particular operational process with respect to an overall delay or a shortage of production at the plant. Therefore, a technology is needed that is capable of bringing together different operating processes and analyzing the operating processes as a related group.

SUMMARY

The example embodiments improve upon the prior art by providing slicing and merging software program and system that can relate operational processes together based on time. For example, the system herein can generate a time graph for each of a plurality of operational processes over a predetermined window of time (arbitrary or specified) at a manufacturing site and overlap the time graphs with one another. Here, each operational process may include a plurality of events that dynamically change over time. The system can determine slices of time within the predetermined window and analyze what events are occurring during each operational process within the specific slice of time. The events occurring in each slice can be merged together and queried or analyzed as a group of events to provide a cumulative analysis of the manufacturing site. In some embodiments, the slice and merge system may be software incorporated within a cloud computing environment of an Industrial Internet of Things (IIoT).

According to an aspect of an example embodiment, a method includes one or more of modeling a plurality of production processes as a plurality of intervals of time which are overlapping one another on a graph over a predetermined period of time, each modeled production process including a sequence of events over time, determining a slice of time on the graph within the predetermined period of time based event timings within the plurality of production process, identifying an event that is occurring in each production process during the slice of time based on the overlapping plurality of intervals of time, and storing the identified events of each production process together as a group along with an identification of the slice of time.

According to an aspect of another example embodiment, a computing system includes one or more of a processor configured to generate a graph of a plurality of production processes modeled as a plurality of intervals of time which are overlapping one another on the graph over a predetermined period of time, each modeled production process including a sequence of events over time, the processor further configured to determine a slice of time on the graph within the predetermined period of time based event timings within the plurality of production process, and identify an event that is occurring in each production process during the slice of time based on the overlapping plurality of intervals of time, and a storage configured to store the identified events of each production process together as a group along with an identification of the slice of time.

Other features and aspects may be apparent from the following detailed description taken in conjunction with the drawings and the claims.

BRIEF DESCRIPTION OF THE DRAWINGS

Features and advantages of the example embodiments, and the manner in which the same are accomplished, will become more readily apparent with reference to the following detailed description taken in conjunction with the accompanying drawings.

FIG. 3 is a diagram illustrating a process of merging event information from the production processes of FIG. 2, in accordance with example embodiments.

Figure 1:
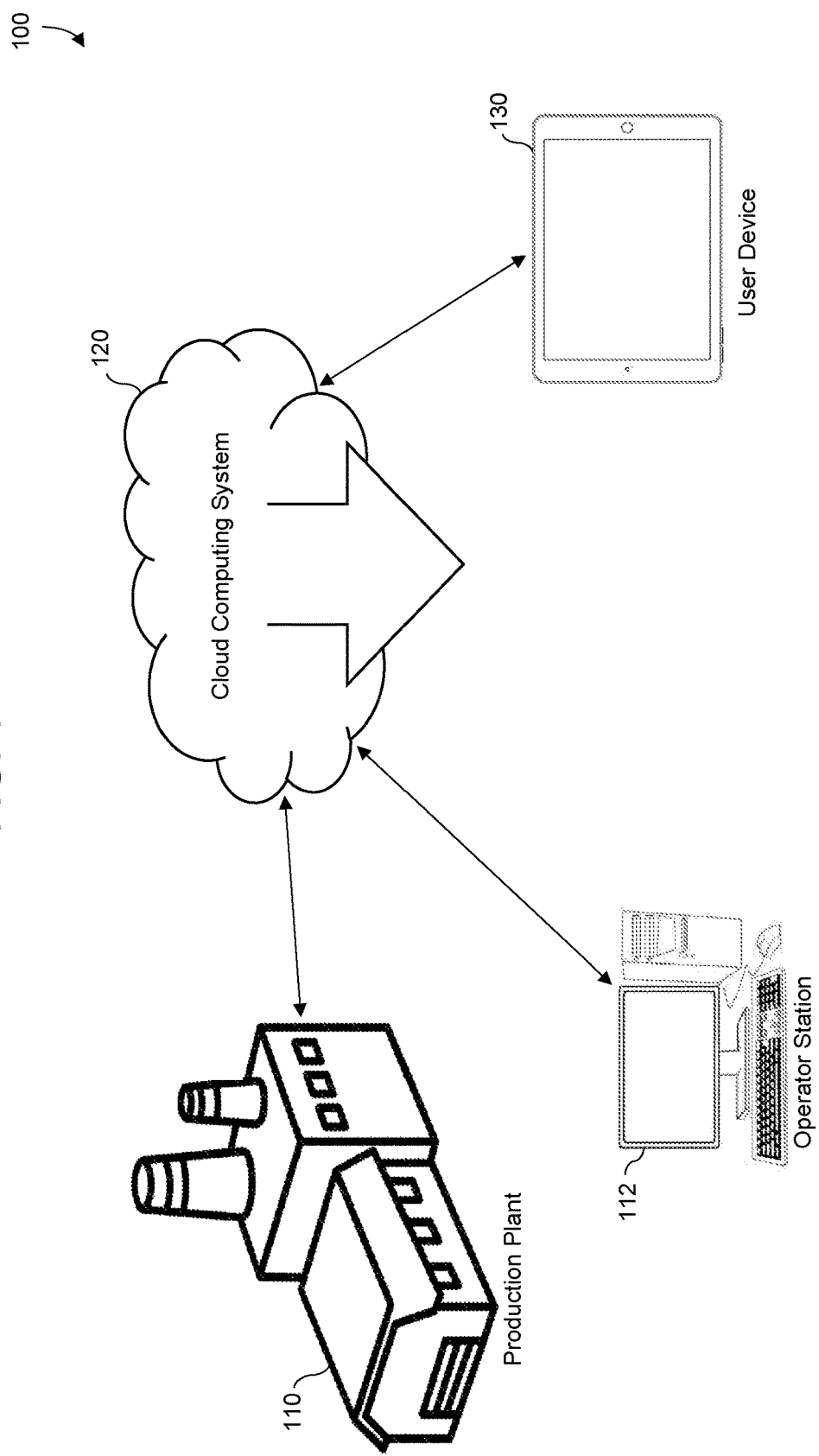
FIG. 1 is a diagram illustrating a cloud computing environment in accordance with an example embodiment.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown, but is to be accorded the widest scope consistent with the principles and features disclosed herein.

The example embodiments are directed to a system and method for cumulatively analyzing different production processes (also referred to as operational processes) at a site such as an industrial manufacturing plant, a factory, or the like. A manufacturing plant can include many different production processes that continuously occur and are monitored including machine and equipment operations, work order processing, user/crews performing skilled and unskilled labor, downtime (expected and unexpected), and the like. However, these events involve different attributes thus making it difficult to relate the production processes together for further analyzation and improvement. For example, labor involves different workers performing different shifts as part of different crews, work orders involve different jobs being accomplished by a combination of machines/equipment and workers to generate resulting materials/products, downtime involves machinery and equipment being shut down for a period of time for maintenance and repair, and the like. Finding a way to relate these different production processes is challenging.

According to various aspects, different production processes can be related to one another based on time. Each process or operation can be modeled over a predetermined window of time and overlapped with one another to create a plurality of overlapping intervals within the window of time. Within each production process may exist a plurality of dynamically changing events that occur during the predetermined window of time. For example, a work order process may include a plurality of different work orders (e.g., events) that are processed during the overall window of time. Each event may have at least one of a start time and an end time within the overall window of time. As another example, a crew/shift production process may have different crews and different shifts changing during the predetermined window of time.

The system can divide the predetermined window of time into a plurality of smaller slices based on timing events within the plurality of operational processes. For example, each time a new event starts or ends, a timing event can be generated. As the different production processes are overlapped with one another, a timing event in a first production process may occur in sequence or right after a timing event from a second production process. The system can slice the window of time based on overall sequential timing events in two different production processes. Also, different slices of time can be generated throughout the overall window based on timing events from all of the production processes being modeled creating a timing relationship between the different production processes. Events occurring in each production process may be identified for each slice. The slice information may be stored and analyzed to determine actions that can be taken at the manufacturing site or predict maintenance, raw material usage, or the like.

The slicing and merging system may be used in conjunction with applications for managing machine and equipment assets and can be hosted within an Industrial Internet of Things (IIoT). In an example, an IIoT connects assets, such as turbines, jet engines, locomotives, healthcare devices, mining equipment, oil and gas refineries, and the like, to the Internet or cloud, or to each other in some meaningful way such as through one or more networks. The software program described herein can be implemented within a "cloud" or remote or distributed computing resource. The cloud can be used to receive, relay, transmit, store, analyze, or otherwise process information for or about assets and manufacturing sites. In an example, a cloud computing system includes at least one processor circuit, at least one database, and a plurality of users or assets that are in data communication with the cloud computing system. The cloud computing system can further include or can be coupled with one or more other processor circuits or modules configured to perform a specific task, such as to perform tasks related to asset maintenance, analytics, data storage, security, or some other function.

FIG. 1 illustrates a cloud computing environment 100 in which production processes at a site (e.g., industrial manufacturing) are monitored, in accordance with an example embodiment. Referring to FIG. 1, the cloud computing environment 100 includes a production plant 110 an operator work station 112 associated with the production plant 110, a cloud computing system 120, and a user device 130. It should be appreciated that additional computing components and devices may be included, and that the example in FIG. 1 is merely shown for convenience of description. The production plant 110 may include machine, equipment, control systems, raw materials, shifts, crews, maintenance logs, and the like, which are associated with the production of goods and which can be monitored. The production plant 110 may include computing devices that may be implemented within the machine or equipment, or which may be external computing devices at the plant such as user devices, workstations, control systems, and the like, which transmit and receive information about the operations at the production plant 110 to the cloud computing system 120. The operator station 112 may be one of the stations included within the production plant 110 or it may be a remote station accessing information from the production plant via a network. The operator station 112 may also transmit data about the production plant 110 to the cloud computing system 120. In some embodiments, the operator station 112 may also be implemented within the cloud computing system 120.

In this example, the cloud computing system 120 may be associated with an Industrial Internet of Things (IIoT). For example, an asset management platform (AMP) can reside in cloud computing system 120, in a local or sandboxed environment, or can be distributed across multiple locations or devices and can be used to interact with assets (not shown). The AMP can be configured to perform functions such as data acquisition, data analysis, data exchange, and the like, with local or remote assets associated with the production plant 110, or with other task-specific processing devices. For example, the AMP may be connected to an asset community (e.g., turbines, healthcare, power, industrial, manufacturing, mining, oil and gas, etc.) which may be communicatively coupled to the cloud computing system 120. Furthermore, the cloud computing system 120 may host the slicing and merging application described herein. That is, the slicing and merging application may be deployed within the cloud computing system 120 and accessible to users such as the operator station 112, the user device 130, or the like. The slicing and merging application is capable of receiving data from or about the production plant 110 and performing analytics and other queries on the operational data. Furthermore, the analyzed/queried data may be provide to the operator station 112 and/or the user device 130 for display and further action.

Information from the production plant 110 and/or the operator station 112 may be communicated from the production plant 110 (or a computing device associated therewith) or the operator station 112 to the cloud computing system 120. In an example, an external sensor can be used to sense information about a function of an asset, or to sense information about an environment condition at or near an asset, a worker, a downtime, a machine or equipment maintenance, a calendar, and the like. The external sensor can be configured for data communication with the cloud computing system 120 which can be configured to use the sensor information in its analysis of operational processes at the production plant 110. Furthermore, an operation of the one or more assets may be enhanced or otherwise controlled by the cloud computing system 120 and/or the user device 130. The data provided from the production plant 110 may include time-series data or other types of data associated with the operations being performed at the production plant 110.

The user device 130 (e.g., smart phone, workstation, tablet, appliance, kiosk, and the like) may connect to the cloud computing system 120 via a network such as the Internet, a private network, a combination thereof, and the like. The user device 130 may purchase or otherwise receive authorization to access one or more applications hosted by the cloud computing system 120 including the slicing and merging software application described herein. In operation, the user device 130 may display a centralized user interface that provides a shell for running instances of the applications and which can be configured for data communication with the cloud computing system 120. The user device 130 can be used to monitor or control one or more machines or equipment at the production plant 110, for example, via the user interface. In an example, information about the production plant 110 may be presented to an operator at the user device 130 from the cloud computing system 120. For example, the user device 130 can include options for optimizing one or more member assets or other components and systems of the production plant 110 based on analytics performed at the cloud computing system 120.

In some embodiments, the cloud computing system 120 may include a local, system, enterprise, or global computing infrastructure that can be optimized for industrial data workloads, secure data communication, and compliance with regulatory requirements. The cloud computing system 120 can include services that developers can use to build or test industrial or manufacturing-based applications and services to implement IIoT applications that interact with output data from the slicing and merging software described herein. For example, the cloud computing system 120 may host a micro services marketplace where developers can publish their distinct services and/or retrieve services from third parties. In addition, the cloud computing system 120 can host a development framework for communicating with various available services or modules. The development framework can offer distinct developers a consistent contextual user experience in web or mobile applications. Developers can add and make accessible their applications (services, data, analytics, etc.) via the cloud computing system 120. One type of application that can be hosted by the cloud computing system 120 and access the slicing and merging software application described herein, is an analytical application. Analytics are capable of analyzing data from or about a manufacturing process and provide insight, predictions, and early warning fault detection.

Figure 2:
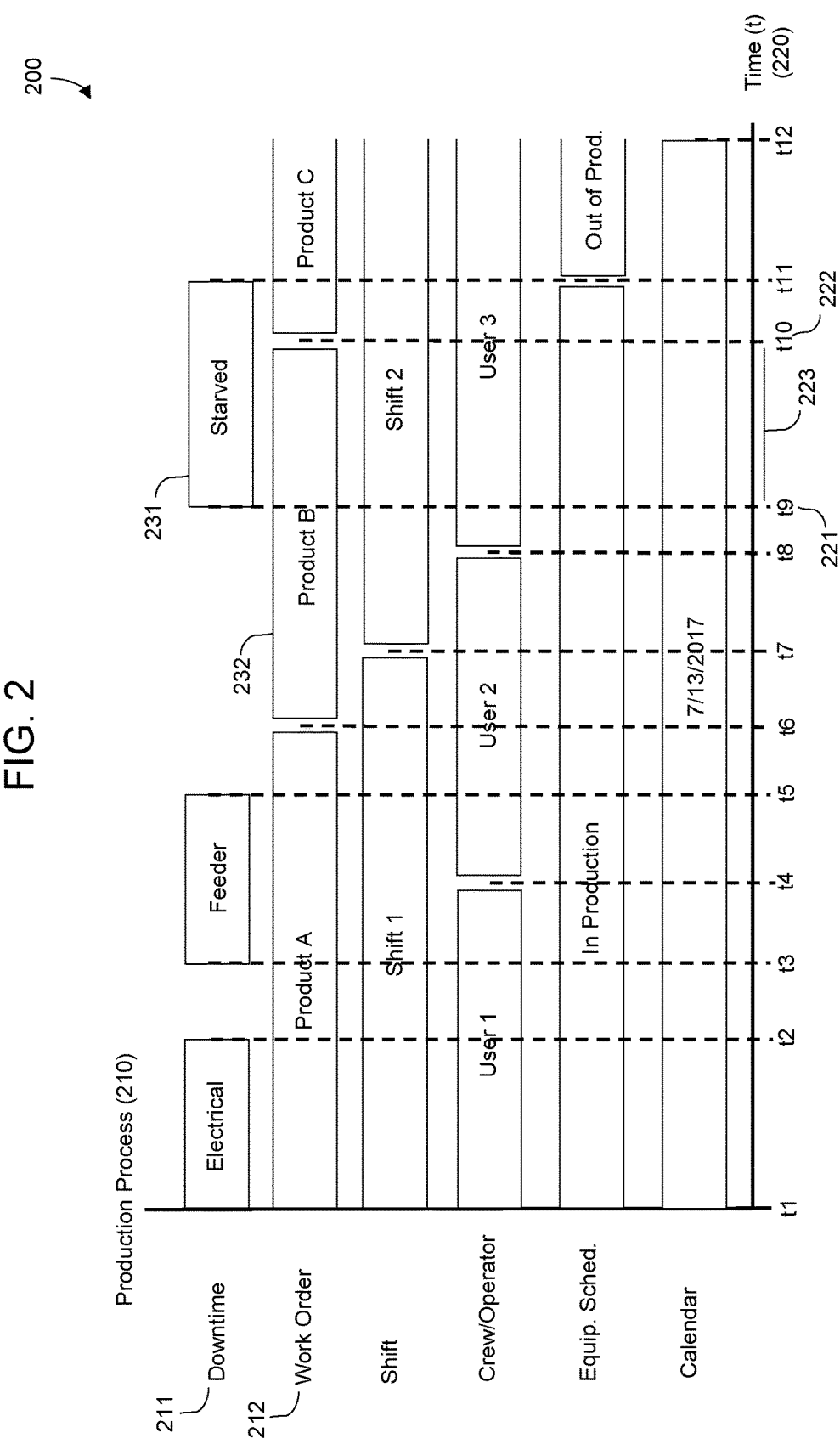
FIG. 2 is a diagram illustrating a process of slicing a plurality of production processes over time in accordance with an example embodiment.

FIG. 2 illustrates a process 200 of slicing a plurality of production processes over time in accordance with an example embodiment, and FIG. 3 illustrates a process 300 of merging event information from the production processes on a per-slice basis, in accordance with example embodiments. As an example, the slicing in 200 and the merging in 300 may be performed sequentially (at the same time) by the same computing device. As another example, the slicing 200 and merging 300 may be performed at separate times and/or by different computing devices. Referring to FIG. 2, a plurality of operational processes 210 are shown and include a downtime, a work order, a shift, a crew/operator, an equipment production schedule, and a calendar. It should be appreciated that the operational processes shown in FIG. 2 are merely for purposes of example and that the model shown in the example of FIG. 2 may be used to represent different operational processes and events that occur. In some cases, the operational processes including machines and people may be monitored continuously or periodically by various entities and the resulting data may be fed to a central system such as a control system, server, cloud platform, or the like. Accordingly, timing information about each operational process may be stored for use by the slicing and merging application described herein.

According to various aspects, the application may receive the timing information about the operational processes 210 and graph each operational process as an interval of time. In this case, the operational process may be continuously monitored and graphed. Each operational process may include one or more events that occur within a predetermined period of time 220. Here, the predetermined period of time 220 may represent the entire window of time between t1 and t12 and may be arbitrarily chosen or may be chosen based on selections or other inputs entered into the application. Furthermore, the individual points of time including t1, t2, t3, . . . t12 may be determined/selected by the application based on timings of events that occur within each of the operational processes 210. The slices of time may have different lengths of time, therefore resulting in dynamic values of time for each slice based on dynamic timing events occurring in the operational processes 210.

In this example, a first operational process 211 represents downtime of any systems or subsystems at the site. In this example, the first operational process 211 includes three downtime events that occur between t1 and t12. In particular, an electrical downtime occurs between t1 and t2, a feeder downtime occurs between t3 and t5, and a starved downtime occurs between t9 and tn. Meanwhile, a second operational process 212 models work orders over time. In this example, the second operational process 212 includes three events or three work orders being performed between t1 and t12 including a product A work order which is performed between t1 and t6, a product B work order which is performed between t6 and t10, and a product C work order between t10 and t11.

The application may identify the points of times based on start times and end times of events that occur within each of the operational processes and apply those timings to all of the operational processes rather than just the operational process in which the events occur. That is, the application may slice the overall predefined window of time into a plurality of slices based on event timings. In the example of FIG. 2, the overall window of time 220 includes timing events (i.e., t1-t12) which may be sliced into eleven different slices of time. Here, the slices of time may be mutually exclusive to one another such that when one slice of time ends, a next slice of time begins. The consecutive and sequential order of the slices of time can occupy the entire window of time 220 or less than the entire window of time 220. Each slice of time may be chosen based on a starting time of an event or an end time of an event. For example, a slice of time 223 which corresponds to (t9-t10) in the graph of FIG. 2, can be determined based on a start time of a downtime event 231 in the first operational process 211 which corresponds to a beginning 221 of the slice of time 223 and an end time of a work order event 232 in the second operational process 212 which corresponds to an end time 222 of the slice of time 223. Different slices may be determined based on the different start times and end times of events as they occur throughout the graph.

Furthermore, based on the slices of time determined by the application as shown in FIG. 2, information about the different operational processes 210 may be merged together as shown in the process 300 in which information about each operational process is merged in per slice of time. In some cases, there are periods or slices of time where no event is detected for an operational process and this can be represented as "None" or a null value. Based on the merged information, a table can be generated such as shown in the process 300 in which the slice of time 310 is identified next to a merged identification of events 320 occurring during that slice of time 310. Furthermore, additional analytics or queries can be performed on the merged data 320 and the slice of time data 310 to analyze the performance at the production plant and provide actions that can be taken to enhance production, remove waste, schedule maintenance and/or repairs, trigger material orders, change work shifts and schedules, and the like. Accordingly, the merged data can be used as input to an analytic or other data processing program which can predict or enhance the performance of the production plant.

Figure 4:
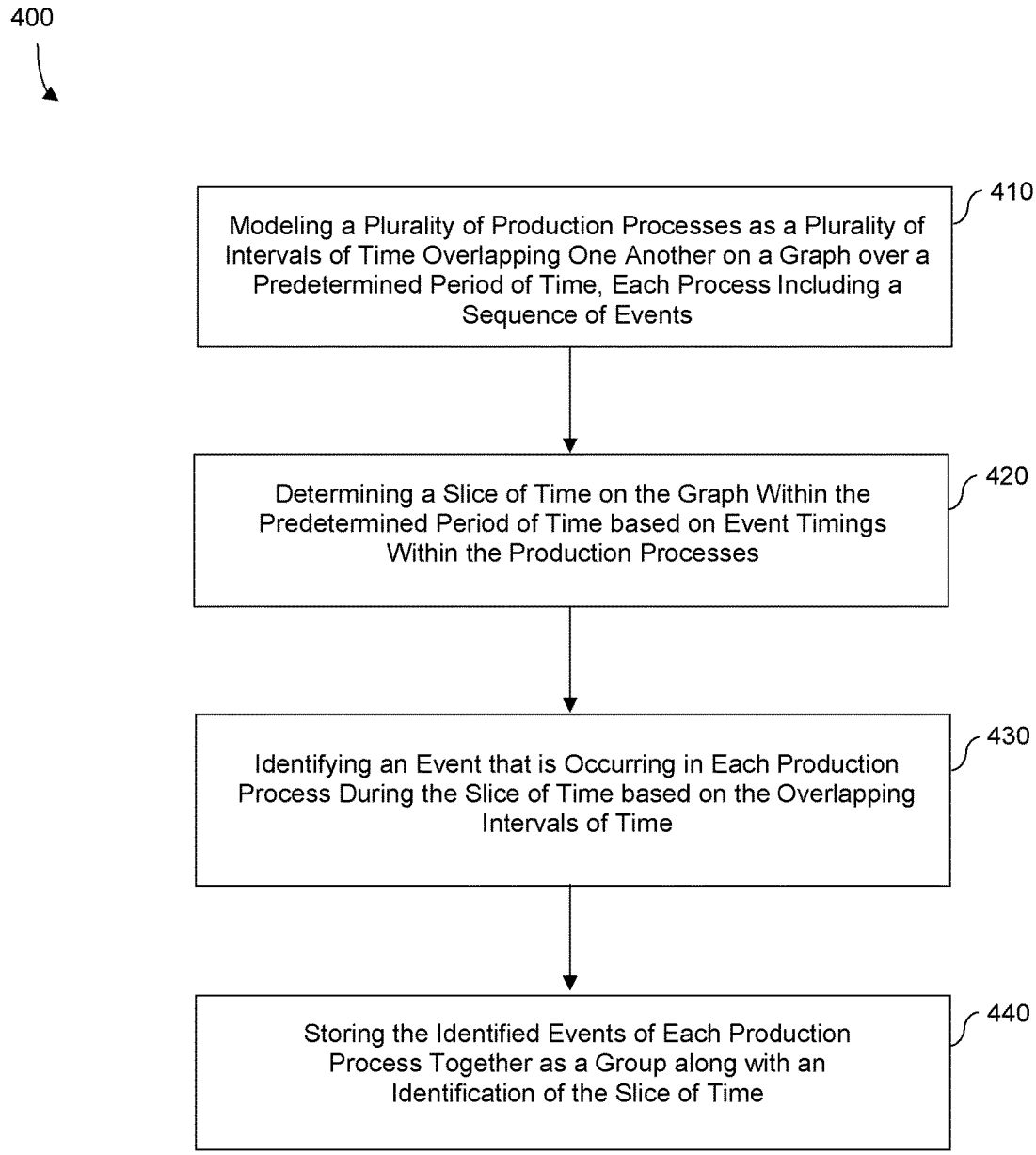
FIG. 4 is a diagram illustrating a method for slicing and merging production events in accordance with an example embodiment.

FIG. 4 illustrates a method 400 for slicing and merging production events in accordance with an example embodiment. For example, the method 400 may be performed by the cloud computing system 120 in FIG. 1 or an instance thereof. As another example, the method 400 may be performed by a server, a database, a user device such as a workstation or mobile device, and the like. Referring to FIG. 4, in 410, the method includes modeling a plurality of production processes as a plurality of intervals of time. The intervals of time may be overlapped with one another on a graph over a predetermined period of time such as a window of time chosen by a user, an arbitrary window of time, a periodic frequency, or the like. According to various aspects, each of the modeled production process includes a sequence of events within the interval of time.

The modeled production process may include a plurality of sequentially occurring events modeled as intervals of time, and each modeled event may include at least one of a start time and an end time within the predetermined period of time. As an example, an interval of time for a first production process may include five sequential events with various times attributed to each of the events. As another example, an interval of time for a second production process may include two events with a gap of time disposed between them during which no event was detected for that production process. The modeled production processes may include operational processes at an industrial manufacturing plant which are being continuously monitored. For example, the operational processes may include one or more of downtime of a machine or equipment, work orders, crew members, shifts, equipment schedules, plant calendar, and the like. The operational processes may include operations that are performed by man and/or machine associated with a manufacturing process.

In 420, the method includes determining a slice of time on the graph within the predetermined period of time based event timings within the plurality of production process. For example, the slice of time may be a fraction of the total time included within the predetermined window of time. For example, the slice of time may determined based on a start time or an end time of an event from a first production process among the plurality of production processes and a start time or an end time of an event from a second production process among the plurality of production processes. Each event start time and end time included within a production process may be identified as a timing point of reference for all production processes at the production plant.

In 430, the method includes identifying an event that is occurring in each production process during the slice of time based on the overlapping plurality of intervals of time, and in 440, storing the identified events of each production process together as a group along with an identification of the slice of time. In some embodiments, although not shown, the method may further include executing one or more of a query and an analytic on the combined identification of events occurring during the slice of time to determine one or more actions to take at a production plant. The analytic may be a KPI-based analytic, queries, or another type of analytic that evaluates a performance of various aspects associated with the manufacturing/production process at the plant.

In some embodiments, the method may include determining a plurality of sequential slices of time from a beginning of the predetermined period of time to an end of the predetermined period of time based on event start and end times within each of the plurality of production processes. For example, the plurality of slices may be consecutive slices of time within the overall window of time. The slices may not overlap each other and may be mutually exclusive or aligning such that when one slice of time ends a next slice of time begins at the same point. In this example, the identifying may identify an event occurring for each production process during each sequential slice of time from among the plurality of sequential slices of time, and in 440, the storing may store, for each sequential slice of time, the respective identified events occurring in each production process during the sequential slice of time along with an identification of the sequential slice of time.

Figure 5:
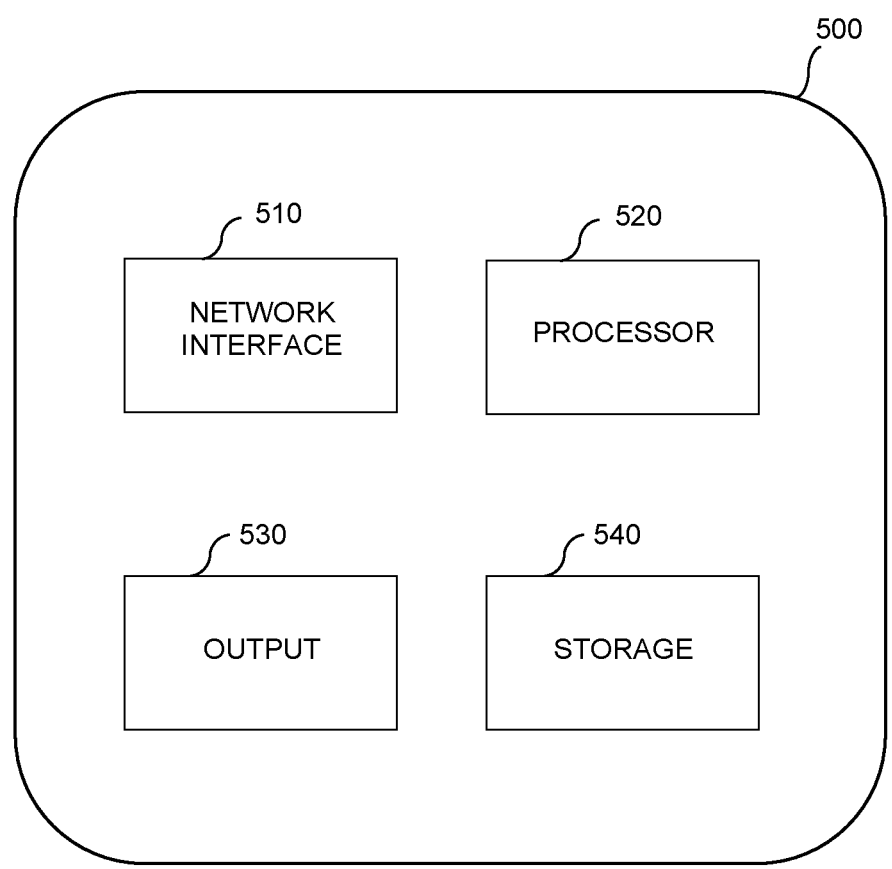
FIG. 5 is a diagram illustrating a computing system for slicing and merging production events in accordance with an example embodiment.

FIG. 5 illustrates a computing system 500 for slicing and merging production events in accordance with an example embodiment. For example, the computing system 500 may be the cloud computing system 120 or an instance thereof, shown in FIG. 1, a database, a user device, a server, or another type of device. Also, the computing system 500 may perform the method 400 of FIG. 4. Referring to FIG. 5, the computing system 500 includes a network interface 510, a processor 520, an output 530, and a storage device 540 such as a memory. Although not shown in FIG. 5, the computing system 500 may include other components such as a display, an input unit, a receiver/transmitter, and the like.

The network interface 510 may transmit and receive data over a network such as the Internet, a private network, a public network, and the like. The network interface 510 may be a wireless interface, a wired interface, or a combination thereof. The processor 520 may include one or more processing devices each including one or more processing cores. In some examples, the processor 520 is a multicore processor or a plurality of multicore processors. Also, the processor 520 may be fixed or it may be reconfigurable. The output 530 may output data to an embedded display of the computing system 500, an externally connected display, a display connected to the cloud, another device, and the like. The storage device 540 is not limited to a particular storage device and may include any known memory device such as RAM, ROM, hard disk, and the like, and may or may not be included within the cloud environment. The storage 540 may store software modules or other instructions which can be executed by the processor 520 to perform the method 400 shown in FIG. 4.

According to various embodiments, the processor 520 may generate a graph of a plurality of production processes modeled as a plurality of intervals of time which are overlapping one another on the graph over a predetermined window or period of time. Here, each modeled production process may include a plurality of sequentially occurring events modeled as intervals of time, and each modeled event may have a start time and an end time within the predetermined period or window of time of the production process. The plurality of production processes may represent operational processes at an industrial manufacturing plant which are being continuously monitored. For example, the operational processes may include one or more of a modeled downtime of a machine or equipment, work orders, crew members, shifts, equipment schedules, and plant calendar. Although the processor 520 is configured to generate the model of the production processes, in some embodiments, the network interface 510 may receive the graph of the plurality of production processes from another device or system.

According to various aspects, the processor 520 may determine a slice of time on the graph within the predetermined window of time based event timings within the plurality of production process. For example, the slice of time may represent a fraction of the time included within the modeled window of time, and may be an interval of time between a start time of an event in a first process and a start time of an event in a second process, or the like. The processor 520 may also identify an event that is occurring in each production process during the slice of time based on the overlapping plurality of intervals of time. Further, the storage 540 may store the identified events of each production process together as a group along with an identification of the slice of time. In addition, the processor 520 may execute a query and/or an analytic on the combined identification of events occurring during the slice of time to determine one or more actions to take at a production plant.

In some embodiments, the processor 520 may determine a plurality of sequential slices of time from a beginning of the predetermined period of time to an end of the predetermined period of time based on event start and end times within each of the plurality of production processes. For example, the processor 520 may identify an event occurring for each production process during each sequential slice of time from among the plurality of sequential slices of time, and store, for each sequential slice of time, the respective identified events occurring in each production process during the sequential slice of time along with an identification of the sequential slice of time in the storage 540.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non-transitory computer readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, semiconductor memory such as read-only memory (ROM), and/or any transmitting/receiving medium such as the Internet, cloud storage, the internet of things, or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor, and may be implemented in a high-level procedural and/or object-oriented programming language, and/or in assembly/machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the disclosure as set forth in the appended claims.

What is claimed is:

1. A computer-implemented method comprising:
   modeling, via a user interface, a plurality of production processes as a plurality of intervals of time which are visually displayed as overlapping one another on a graph over a predetermined period of time, each modeled production process displaying sequence of one or more events;
   dividing the displayed graph into a plurality of slices of time based on timings of events within the plurality of production processes;
   a slice of time on the graph from among the plurality of slices within the predetermined period of time;
   identifying an event that is displayed in an interval of time of each production process during the selected slice of time on the graph based on the visually displayed overlapping plurality of intervals of time; and
   storing the identified events of each production process together as a group along with an identification of the selected slice of time.

2. The computer-implemented method of claim 1, further comprising executing one or more of a query and an analytic on the combined identification of events occurring during the slice of time to determine one or more actions to take at a production site.

3. The computer-implemented method of claim 1, wherein each modeled production process includes a plurality of sequentially occurring events modeled as visual intervals of time, and each modeled event has a start time and an end time within the predetermined period of time of the production process.

4. The computer-implemented method of claim 3, wherein the selected slice of time is determined based on a start time of an event from a first production process among the plurality of production processes and at least one of a start time and an end time of an event from a second production process among the plurality of production processes.

5. The computer-implemented method of claim 1, wherein the plurality of production processes are operational processes at an industrial manufacturing plant which are being continuously monitored.

6. The computer-implemented method of claim 1, wherein the plurality of modeled production processes comprise models of one or more of downtime of a machine or equipment, work orders, crew members, shifts, equipment schedules, and plant calendar.

7. The computer-implemented method of claim 1, wherein the dividing comprises generating a plurality of sequential slices of time from a beginning of the predetermined period of time on the graph to an end of the predetermined period of time on the graph based on event start and end times within each of the plurality of production processes.

8. The computer-implemented method of claim 7, wherein the identifying the event that is occurring in each production process comprises identifying an event occurring for each production process during each sequential slice of time from among the plurality of sequential slices of time, and
    storing, for each sequential slice of time, the respective identified events occurring in each production process during the sequential slice of time along with an identification of the sequential slice of time.

9. A computing system comprising:
    a processor configured to
        generate a graph of a plurality of production processes modeled as a plurality of intervals of time, via a user interface which are visually displayed as overlapping one another on the graph over a predetermined period of time, each modeled production process displaying a sequence of one or more events,
        divide the displayed graph into a plurality of slices of time based on timings of events within the plurality of production processes,
        select a slice of time on the graph from among the plurality of slices within the predetermined period of time, and
        identify an event that is displayed in an interval of time of each production process during the selected slice of time on the graph based on the visually displayed overlapping plurality of intervals of time; and
    a storage configured to store the identified events of each production process together as a group along with an identification of the selected slice of time.

10. The computing system of claim 9, wherein the processor is further configured to execute one or more of a query and an analytic on the combined identification of events occurring during the slice of time to determine one or more actions to take at a production site.

11. The computing system of claim 9, wherein each modeled production process includes a plurality of sequentially occurring events modeled as visual intervals of time, and each modeled event has a start time and an end time within the predetermined period of time of the production process.

12. The computing system of claim 11, wherein the processor determines the selected slice of time based on a start time of an event from a first production process among the plurality of production processes and at least one of a start time and an end time of an event from a second production process among the plurality of production processes.

13. The computing system of claim 9, wherein the plurality of production processes are operational processes at an industrial manufacturing plant which are being continuously monitored.

14. The computing system of claim 9, wherein the plurality of modeled production processes comprise one or more of a modeled downtime of a machine or equipment, work orders, crew members, shifts, equipment schedules, and plant calendar.

15. The computing system of claim 9, wherein the processor determines a plurality of sequential slices of time from a beginning of the predetermined period of time on the graph to an end of the predetermined period of time on the graph based on event start and end times within each of the plurality of production processes.

16. The computing system of claim 15, wherein the processor identifies an event occurring for each production process during each sequential slice of time from among the plurality of sequential slices of time, and stores, for each sequential slice of time, the respective identified events occurring in each production process during the sequential slice of time along with an identification of the sequential slice of time.

17. A non-transitory computer readable medium having stored therein instructions that when executed cause a computer to perform a method comprising:
    modeling, via a user interface, a plurality of production processes as a plurality of intervals of time which are visually displayed as overlapping one another on a graph over a predetermined period of time, each modeled production process displaying a sequence of one or more events;
    dividing the displayed graph into a plurality of slice of time based on timings of events within the plurality of production processes,
    selecting a slice of time of the graph from among the plurality of slices within the predetermined period of time;
    identifying an event that is displayed in an interval of time of each production process during the selected slice of time on the graph based on the visually displayed overlapping plurality of intervals of time; and
    storing the identified events of each production process together as a group along with an identification of the slice of time.

18. The non-transitory computer readable medium of claim 17, wherein the method further comprises performing one or more of a query and an analytic on the combined identification of events during the slice of time to determine one or more actions to take at a production site.

19. The non-transitory computer readable medium of claim 17, wherein each modeled production process includes a plurality of sequentially occurring events modeled as visual intervals of time, and each modeled event has a start time and an end time within the predetermined period of time of the production process.

20. The non-transitory computer readable medium of claim 17, wherein the selected slice of time is determined based on a start time of an event from a first production process among the plurality of production processes and at least one of a start time and an end time of an event from a second production process among the plurality of production processes.

* * * * *